(12) United States Patent
Buck

(10) Patent No.: US 7,899,736 B1
(45) Date of Patent: Mar. 1, 2011

(54) SYSTEM AND METHOD FOR COMPUTING AND DISPLAYING EFFECTIVE BID AND ASK INFORMATION

(75) Inventor: Brian J. Buck, Lisle, IL (US)

(73) Assignee: Trading Technologies International, Inc., Chicago, IL (US)

( * ) Notice: Subject to any disclaimer, the term of this patent is extended or adjusted under 35 U.S.C. 154(b) by 134 days.

(21) Appl. No.: 11/415,376

(22) Filed: May 1, 2006

Related U.S. Application Data

(63) Continuation of application No. 10/876,409, filed on Jun. 25, 2004.

(51) Int. Cl.
*G06Q 40/00* (2006.01)

(52) U.S. Cl. .......................... 705/37; 705/35

(58) Field of Classification Search ................. 705/35, 705/37
See application file for complete search history.

(56) References Cited

U.S. PATENT DOCUMENTS

| | | | | |
|---|---|---|---|---|
| 5,845,266 | A * | 12/1998 | Lupien et al. ............. | 705/36 R |
| 5,924,083 | A * | 7/1999 | Silverman et al. ............ | 705/37 |
| 6,408,282 | B1 * | 6/2002 | Buist ....................... | 705/36 R |
| 6,772,132 | B1 | 8/2004 | Kemp, II et al. | |
| 6,993,504 | B1 | 1/2006 | Friesen et al. | |
| 7,127,424 | B2 * | 10/2006 | Kemp et al. ................. | 705/37 |
| 7,177,833 | B1 * | 2/2007 | Marynowski et al. ........ | 705/38 |
| 7,228,289 | B2 * | 6/2007 | Brumfield et al. ............ | 705/35 |
| 7,243,083 | B2 * | 7/2007 | Burns et al. ................. | 705/37 |
| 7,308,428 | B1 * | 12/2007 | Federspiel et al. ........ | 705/36 R |
| 7,315,835 | B1 * | 1/2008 | Takayasu et al. ............. | 705/35 |
| 7,389,268 | B1 | 6/2008 | Kemp, II et al. | |
| 7,603,290 | B1 * | 10/2009 | Tenorio ....................... | 705/26 |
| 7,650,305 | B1 * | 1/2010 | Tenorio ....................... | 705/37 |
| 2001/0014874 | A1 * | 8/2001 | Iida et al. .................... | 705/36 |
| 2002/0055899 | A1 | 5/2002 | Williams | |
| 2002/0082849 | A1 * | 6/2002 | Tenorio ....................... | 705/1 |
| 2002/0099644 | A1 | 7/2002 | Kemp, II et al. | |
| 2002/0111896 | A1 * | 8/2002 | Ben-Levy et al. ............ | 705/37 |
| 2002/0178105 | A1 * | 11/2002 | Levine ........................ | 705/37 |

(Continued)

OTHER PUBLICATIONS

OM Gruppen AB, "The OM Click Trade User's Guide—for Windows NT", Apr. 1995.

(Continued)

*Primary Examiner* — Jagdish N Patel
*Assistant Examiner* — Kenneth Bartley
(74) *Attorney, Agent, or Firm* — McDonnell Boehnen Hulbert & Berghoff LLP

(57) ABSTRACT

A data feed from an electronic exchange carries certain pieces of market information. Software at the trading station receives the data feed and computes an effective bid price and/or an effective ask price based on a particular quantity to trade. Then, the effective bid price and/or effective ask price are indicated to the user. An effective bid price is an average price at which a certain quantity could be sold based on current market conditions. An effective ask price is an average price at which a certain quantity could be bought based on current market conditions. Depending on the available quantities in the market, the effective prices may represent spreads different from the actual spread of the inside market. Additionally, a derivative of price, such as yield, may be used to compute other types of effective bid and/or ask information.

21 Claims, 9 Drawing Sheets

U.S. PATENT DOCUMENTS

| | | | |
|---|---|---|---|
| 2003/0004852 A1* | 1/2003 | Burns | 705/37 |
| 2003/0009411 A1* | 1/2003 | Ram et al. | 705/37 |
| 2003/0023542 A1* | 1/2003 | Kemp et al. | 705/37 |
| 2003/0069834 A1* | 4/2003 | Cutler | 705/37 |
| 2003/0074292 A1 | 4/2003 | Masuda | |
| 2003/0200167 A1* | 10/2003 | Kemp et al. | 705/37 |
| 2003/0225628 A1* | 12/2003 | Sandholm et al. | 705/26 |
| 2003/0236737 A1 | 12/2003 | Kemp, II et al. | |
| 2004/0117292 A1 | 6/2004 | Brumfield et al. | |
| 2004/0193524 A1* | 9/2004 | Almeida et al. | 705/36 |
| 2005/0228735 A1* | 10/2005 | Duquette | 705/37 |
| 2007/0118463 A1* | 5/2007 | Avery | 705/37 |

OTHER PUBLICATIONS

Buck, U.S. Appl. No. 10/876,409, filed Jun. 25, 2004.

* cited by examiner

SYSTEM AND METHOD FOR COMPUTING AND DISPLAYING EFFECTIVE BID AND ASK INFORMATION

CROSS REFERENCE TO RELATED APPLICATION

This application is a continuation of U.S. patent application Ser. No. 10/876,409 filed Jun. 25, 2004, entitled "System and Method for Computing and Displaying Effective Bid and Ask Information," the contents of which are fully incorporated herein by reference.

TECHNICAL FIELD

The present invention relates to the visual output of information in an electronic trading environment, in which computer-based trading stations are used to interface with an electronic exchange. In particular, the present invention relates to computing and displaying effective bid and/or ask information.

BACKGROUND

Many mental calculations are made during the course of a trading day. While some of those decisions can be determined by specially programmed computers, many are still made by the trader, himself. The mental burden and stress can be especially high during times when prices and quantities in the market are changing.

To reduce this burden, much time and money have been spent on developing better and more intuitive graphical user interfaces, which are run on trading stations used to interface with an electronic exchange. Accordingly, market information is processed and arranged on these specialized trading interfaces in way that reduces the mental effort required of a person to visualize the market, ultimately increasing the speed at which a trader can visualize the market's movement.

In particular, an electronic exchange generates and publishes market data to its customers, who sit behind the trading stations. The market data is received by the trading stations, which are listening for specific market data. The market data generally contains, among other things, quantity and price information. Software running on the trading stations receives the data, processes it, and presents it to the user on a screen in a particular format. Some kinds of software and/or hardware are specially designed to assist the user in assimilating and visualizing the market through its visual output display.

FIG. 1 illustrates one type of trading screen that provides an especially intuitive display of the market. In particular, a value axis 104 is generated based on certain conditions in the market. The value axis 104 displays a graduated scale in price, although other values could be used instead of price, such as implied volatility or net change, for instance. Once the value axis 104 is generated, quantity and price information contained in the market data feed is used to populate the display against the value axis 104. As new quantity and price information arrive, the trading screen is updated to reflect the market changes. The intuitiveness of the trading screen results from, among other things, the dynamic display of aggregated quantities, collectively shown as 102, against the generated value axis 104. Locations are, in essence, fixed in relation to the value levels, so that as the market climbs or drops in value, the user can quickly view these market changes. Generally speaking, the value levels along the value axis 104 change only when a re-centering command is received or when the trader manually scrolls along the value axis 104.

As shown in FIG. 1, bid quantities are displayed at locations in the "Bid" column and ask quantities are displayed at locations in the "Ask" column. By looking at the trading screen in FIG. 1, the user can quickly locate the inside market, which refers to the highest bid price and the lowest ask price, at a price of "230" and "232," respectively. Further, the trader can view how much quantity—e.g., bid and ask quantity—is currently available in the market at the inside market and at other price levels. The quantity available in the market is referred to herein as market depth. The quantity available at the inside market may be considered the first level of market depth. The quantity available at the next best prices may be considered the second level of market depth, and so on. Generally, the electronic exchange limits the amount of market depth provided in its market data feed. Most often, this is done to reduce network bandwidth consumption.

To enter an order using the trading screen shown in FIG. 1, a user can preset a quantity, and with an input device, select a cell in the "Bid" or "Ask" columns associated with the desired price of the order. For instance, the preset quantity is currently set to "105." Now, if the cell associated with the price of "229" is selected in the "Bid" column (it just so happens that a quantity of "25" is already in the market, and accordingly, displayed in the cell), then an order to buy "105" at a price of "229" would be sent to the electronic exchange. If the cell associated with the price of "232" is selected in the "Ask" column (it just so happens that a quantity of "56" is already in the market), then an order to sell "105" at a price of "232" would be sent to the electronic exchange. Orders may be sent at other price levels too. The trading screen allows for fast order entry, but any kind of order entry system may be used to submit buy and sell orders to the electronic exchange.

A trading screen similar to that shown in FIG. 1 is commercially available as MD Trader™ in the X_Trader® product offered by Trading Technologies International, Inc. of Chicago, Ill. Moreover, various aspects of the trading screen in FIG. 1, including the dynamic movement of the bid and offer indicators against a static axis, are described in U.S. patent application Ser. No. 09/590,692, filed on Jun. 9, 2000, and entitled, "Click Based Trading With Intuitive Grid Display of Market Depth." Adjustable viewing of the axes, including the consolidation of price levels, is described in U.S. patent application Ser. No. 09/971,087, filed on Oct. 5, 2001, and entitled, "Click Based Trading with Intuitive Grid Display of Market Depth and Price Consolidation." A variety of trading tools that can be used with the trading screen to assist in visualizing the market are further described in U.S. patent application Ser. No. 10/125,894, filed on Apr. 19, 2002, and entitled, "Trading Tools for Electronic Trading." The entire content of each of the above-referenced applications is incorporated herein by reference.

Many advances, including the development of the intuitive trading screen found in FIG. 1, have been made in the field of electronic trading. As recognized by those in the field, among others, it is increasingly important to have a system of making the most accurate and calculated trades possible in the most efficient manner. It is therefore desirable for electronic trading systems to offer tools that can assist a trader in trading in an electronic marketplace, and help the trader to make trades at the most favorable prices in a speedy and accurate manner.

BRIEF DESCRIPTION OF THE DRAWINGS

Many aspects of the preferred embodiments may be better understood with reference to the following drawings. The components in the drawings are not necessarily to scale, emphasis instead being placed upon illustrating example embodiments. Also, the same numbers, if any, refer to the same elements throughout.

DETAILED DESCRIPTION

I. Overview

Figure 1:
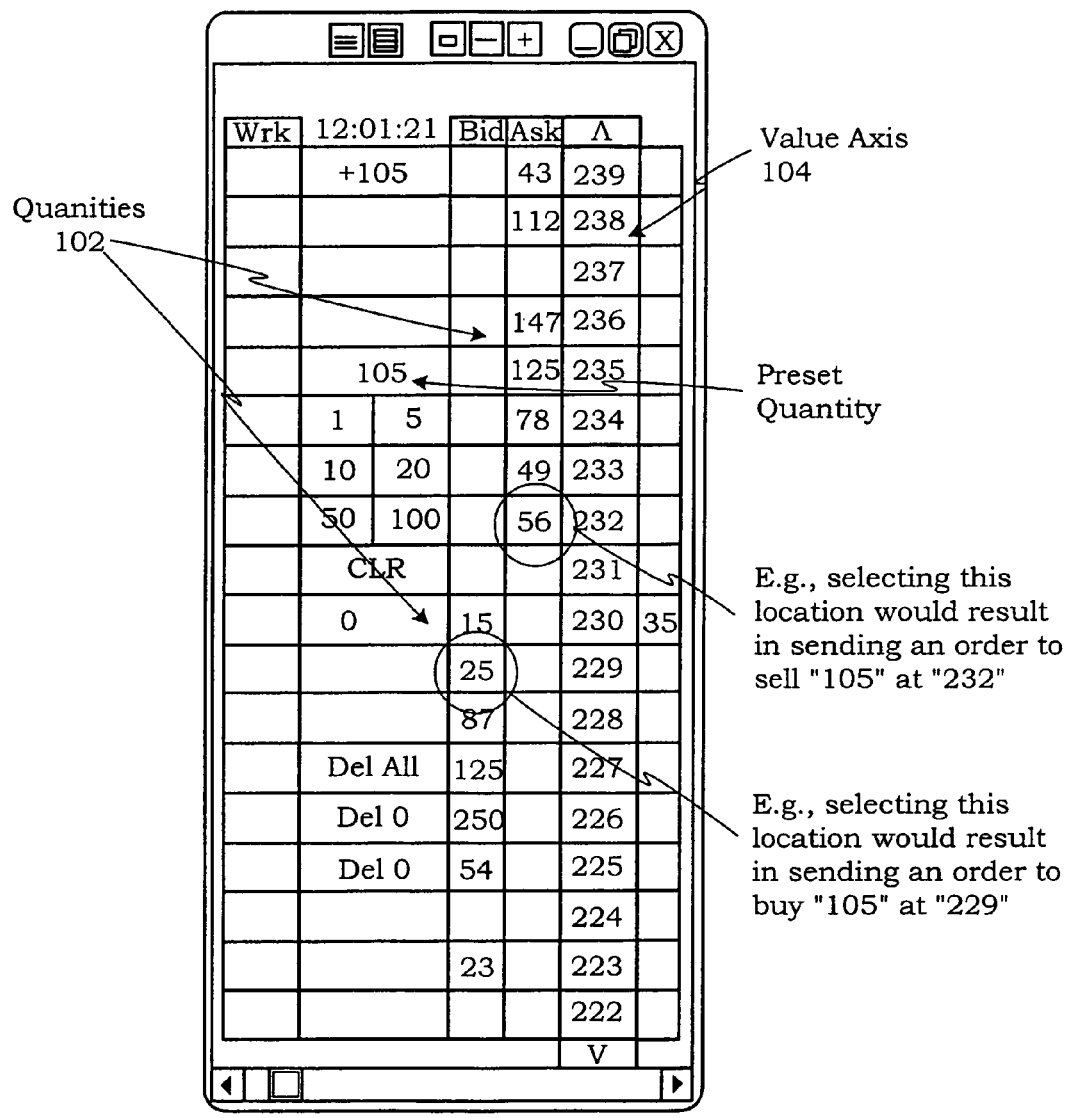
FIG. 1 is an illustration of an intuitive trading display that is a result of a graphical user interface which is operatively run on a trading station and used in trading at an electronic exchange.

The preferred embodiments are appropriate for use in electronic trading environments, and particularly with those, in which, an electronic exchange provides market depth in its data feed. Accordingly, a system and method are presented herein that can look beyond quantity levels at inside market prices and into additional market depth levels to compute and convey effective bid and/or ask prices. An effective bid price is an average price at which a certain quantity could be sold based on current market conditions. An effective ask price is an average price at which a certain quantity could be bought based on current market conditions. An effective bid/ask spread is the difference between the effective bid price and the effective ask price. Various example embodiments are presented herein to illustrate different aspects of the preferred embodiments. The preferred embodiments may, however, be embodied in many different forms and should not be construed as limited to the example embodiments set forth herein.

While the preferred embodiments compute and convey effective bid and/or ask prices, there might be times when another variable is of interest, such as a derivative of price. A derivative of price refers to anything that bears some relationship to price, examples of which include net change, yield, profit and loss, volatility, momentum indicators, and more. For instance, yield may be of more interest to someone trading bonds. As such, the concept of an effective bid price and an effective ask price may be extended to an effective bid yield and an effective ask yield, respectively. In one example, yield may be found by the relationship: yield=(Coupon Amount)/(Price). Thus, if the market data is given in yield numbers rather than prices, the corresponding price levels could be calculated, which may be used to compute effective bid and/or ask prices. Then, the effective bid and/or ask yield may be computed from the effective bid and/or ask prices. Other yield-to-price relationships may be used. Accordingly, any derivative of price may be used as an alternative to price.

As used herein, the term "tradeable object" refers to anything that can be traded with a quantity and/or a price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable object, such as a class of tradeable objects.

Other features and advantages of the preferred embodiments will become apparent to one with ordinary skill in the art upon examination of the following drawings and description. It is intended that all such features and advantages be included within the scope of the present invention, and be protected by the accompanying claims. Further, it will be appreciated by those of ordinary skill in the art that the systems of the preferred embodiments may be provided as methods or computer readable program means.

II. Example System Architecture

Figure 2:
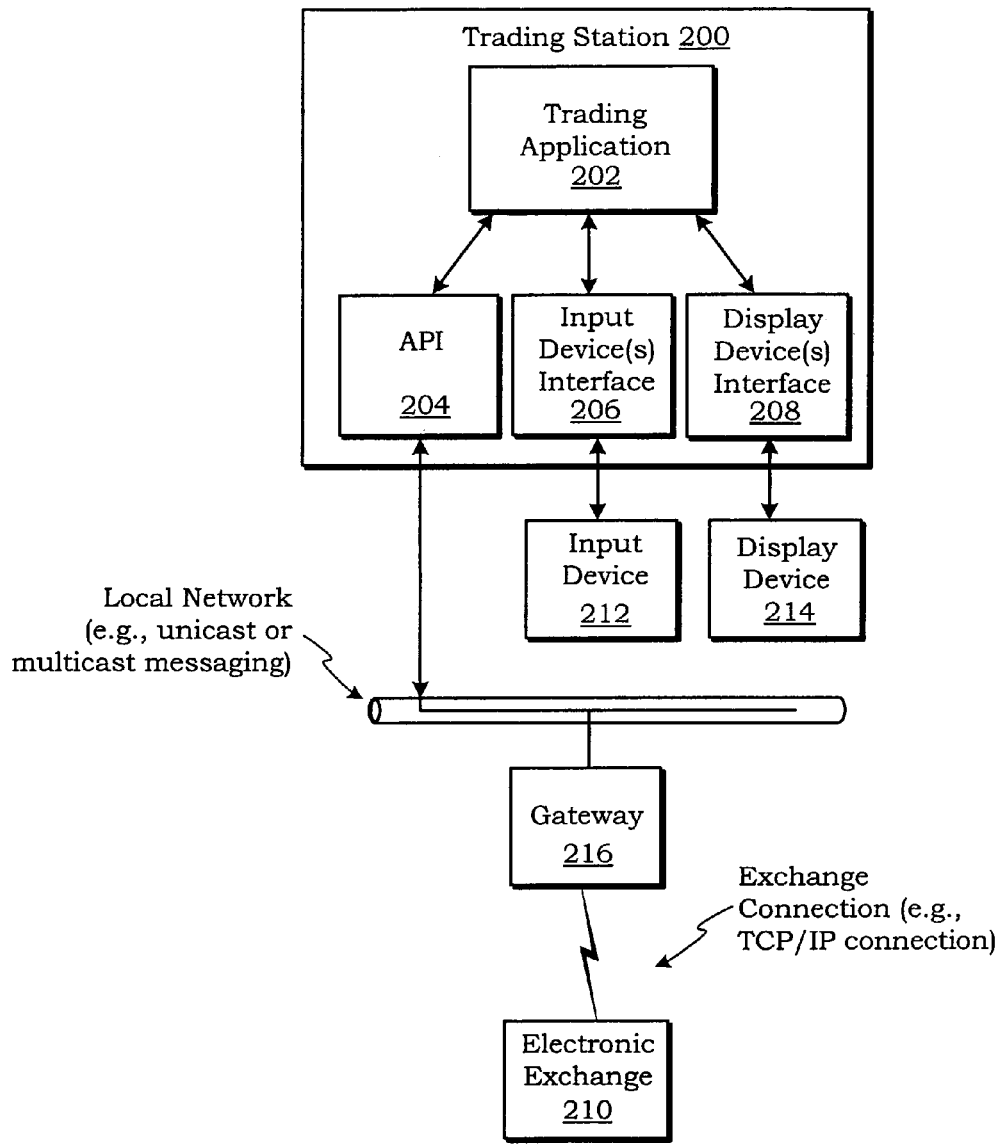
FIG. 2 is a block diagram of an example system that utilizes the preferred embodiments to compute and display effective price information on a trading display.

FIG. 2 shows an example computer system, referred to as trading station 200, which includes a trading application 202 coupled to an application program interface (API) 204, an input device interface 206, and a display device interface 208. The various components in the computer system may be coupled by way of a bus (not shown). It will be appreciated by those of ordinary skill in the art that the preferred embodiments are not limited by the system architecture shown in FIG. 2, including the computer system and the network topology.

In a preferred embodiment, the trading application 202 represents software stored in memory that when executed can arrange and display (with the help of the display device 214) information in accordance with a preferred embodiment. The trading application 202 can send signals through the display device interface 208 to the display device 214, which might include a cathode-ray tube (CRT), a liquid crystal display (LCD), plasma display, or some other type of monitor. The trading application 202 can also receive signals from an input device 212, such as a mouse or keyboard, via the input device interface 206.

The trading application 202 communicates through the API 204 to the gateway 216 on a local network, which in turn communicates with the electronic exchange 210. While the gateway 216 is usually located at the customer site on the local network, it may instead be located at the exchange 210 or some other network access point. In some instances, a particular gateway contains software produced exclusively by or for the electronic exchange to which the gateway connects. The trading station 200 and the gateway 216 may use middleware to communicate across the local network. Any messaging scheme can be used to communicate across the local network, such as unicast or multicast messaging.

The gateway 216 can communicate with the electronic exchange 210 over any type of connection. The exchange connection might include a TCP/IP connection, in which TCP/IP is a well-known suite of protocols. Of course, other types of the protocols, including proprietary or nonproprietary, can be utilized. It is also understood that other hardware and software packages can lie between the trading station 200 and the electronic exchange 210. These may include third-party machines and devices, third-party networks, hardware and/or software configurations specific to the customer site and security measures like firewalls, hubs, security managers, and routers.

According to a preferred embodiment, the electronic exchange 210 disseminates a market data feed to the trading station 200 through the gateway 216, which is then distributed over the local network to the trading station 200. While the actual content of the data feed and the particular message format may depend on the exchange 210, most electronic exchanges provide similar data. Accordingly, a market data feed may carry items such as the inside market prices, market depth—e.g., quantity available at particular price levels including the inside market prices, the last traded quantity (LTQ), the last traded price (LTP), settlement price, yesterday's closing price, and so on. The number of items in a market data feed, including the number of market depth levels, is often dependent on the electronic exchange 210.

The trading application 202 receives the market data feed, in one form or another, processes the information, and displays it on the display device 214, in accordance with the preferred embodiments. Based on the information, traders may respond by taking actions which are input through the input device 212, such as sending buy or sell orders, deleting orders, setting order parameters, among many other things.

Additionally, automated or semi-automated trading tools collectively referred to herein as automated trading tools, may use the effective price information. An automated trading tool might be a part of the trading application 202, a standalone software application (not shown in FIG. 2) running on the trading station 200, and/or a software application running (also not shown in FIG. 2) on the gateway 216 or some other device. Irrespective of where the automated trading tool is executed, the automated trading tool may be programmed to receive the effective price information and take action on the information. For instance, an automated trading tool, referred to as the "automated trader," may use the effective price information in implementing a particular trading strategy. The "automated trader" is described in U.S. patent application Ser. No. 10/284,584, filed on Oct. 31, 2002, and entitled, "System and Method for Automated Trading," the contents of which are incorporated herein by reference.

III. Example Process

The process of computing and displaying the effective price information in accordance with the preferred embodiments is performed by the trading application 202. As such, the process may be embodied in the form of a computer program product that is stored on a computer readable storage medium and is executed by a suitable instruction system in the computer device. Any suitable computer readable medium may be utilized including hard disks, CD-ROMS, optical storage devices, magnetic storage devices, or any type of known computer readable medium. It is also understood that the preferred embodiments may be implemented in an entirely hardware embodiment, or in a combination of software and hardware.

Figure 3:
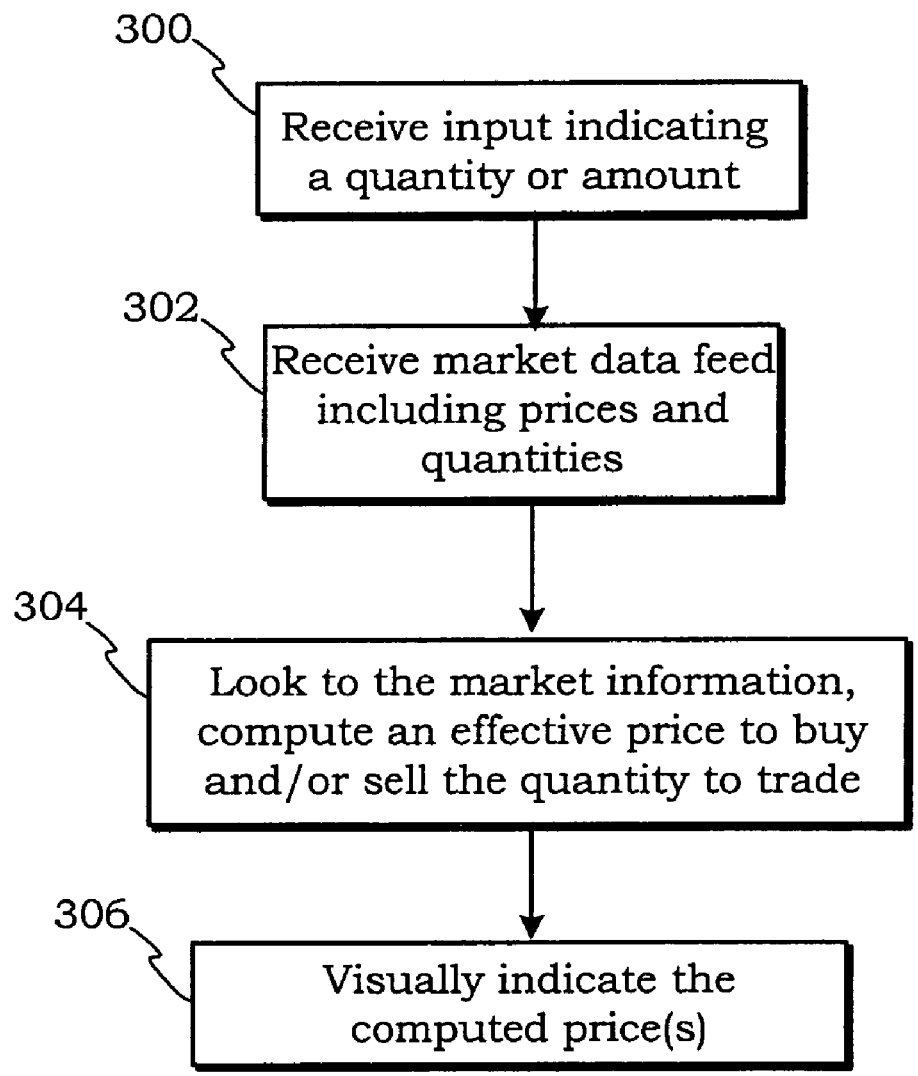
FIG. 3 is a flowchart for illustrating an example process of computing and displaying effective price information iii accordance with the preferred embodiments.

FIG. 3 is a flowchart that illustrates an example process for computing and indicating effective bid and/or ask prices. Each block in FIG. 3 may represent a module, segment, or portion of code, which includes one or more executable instructions for implementing specific logical functions or steps in the process. Alternate implementations are included within the scope of the preferred embodiments in which functions may be executed out of order from that shown or discussed, including substantially concurrently or in reverse order, depending on the functionality involved, as would be understood by those reasonable skilled in the art. Further, it is understood that some steps may not need to be implemented to achieve the desired result.

At block 300, an input is received indicating a quantity to trade. In one embodiment, the quantity to trade is a preset order parameter that, in a preferred embodiment, can be entered through the use of an input device. Using the preset quantity, the system preferably recognizes that the next order will be for that quantity or amount, and if the preset quantity changes, so would the input signal. Generally speaking, each order sent to an electronic exchange has a quantity associated with it. The measurement of quantity is often dependent on the tradeable object and/or the electronic exchange at which it is traded. For instance, in the futures industry, the contract size of corn at a particular exchange is 5,000 bushels, so if a trader bought one corn contract, he really bought 5,000 bushels. Of course, the preferred embodiments are not limited for use with futures or any particular exchange, therefore the precise meaning of quantity is irrelevant. Referring briefly to FIG. 1, a preset quantity of "105" is shown.

In another embodiment, an input is received indicating a number of different quantity levels or amounts to trade. That way, effective bid and/or ask prices may be computed and indicated for each of the different quantity levels. The range of effective bid and/or ask prices may then be viewed and used, accordingly. This embodiment or various aspects of this embodiment are described below with respect to FIGS. 6-9.

At block 302, a market data feed is received. As indicated earlier, each electronic exchange provides a particular data feed, but each data feed preferably contains price and quantity information for one or more depth levels. Of course, the price can be represented in any format, including ticks, where a "tick" is the minimum amount that the price of a tradeable object can change. Accordingly, prices may be quoted in terms other than a particular dollar amount. It is also understood that a market data feed might contain a derivative of price, instead of, or in addition to the price information, and if so, the preferred embodiments may use the derivative of price in its computations. If the market data feed does not contain a derivative of price, the system may determine it (if desired) based on the price information and a formula.

At block 304, an effective price to buy and/or sell the tradeable object is computed. Many times, a trader is interested in trading more than what is available at the inside market prices. This block preferably takes into account the quantity that the trader is considering to trade (e.g., through the preset quantity parameter), and computing an effective price at which he could buy and/or sell that amount. For instance, using the market information presented in FIG. 1 and the preset quantity of "105," the effective ask and bid prices can be computed:

$$\text{Effective ask price} = \frac{56}{105}(232) + \frac{49}{105}(233) = \underline{232.46^*}$$

$$\text{Effective bid price} = \frac{15}{105}(230) + \frac{25}{105}(229) + \frac{65}{105}(228) = \underline{228.5238}$$

The effective ask price "232.46*" represents an average price for which a quantity of "105" could be bought, and the effective bid price "228.5238" represents an average price for which a quantity of "105" could be sold. (The "*" next to the 6 represents the repeating decimal, i.e., 232.4666666 . . . . )

If a derivative of price is used (but the derivative of price information is not provided in the data feed), then according to one embodiment, the system's software preferably calculates the corresponding price levels associated with the derivative of price (e.g., yield) and the effective price information may be computed. Then, the effective derivative of price information (e.g., effective bid yield and effective ask yield) may be computed from the effective price information.

At block 306, the effective bid and/or ask prices are visually indicated. The effective price information may be indicated by highlighting the effective ask price and/or the effective bid price. Highlighting might be done by displaying a line or marker in association with the effective price levels, coloring the effective price levels to distinguish them from other price levels, coloring the effective price levels to distinguish them from other effective price levels, displaying the numbers which represent the effective price levels, or through any other means of visually indicating the effective price information. Examples are provided directly below.

It is also understood that the process of computing and displaying effective price information, such as the example process set forth in FIG. 3, may be repeated as many times as needed, and the process can preferably be initiated by a change in the preset quantity, new market information, upon a signal by the user, and/or initiated by some other trigger.

Example A

Figure 4:
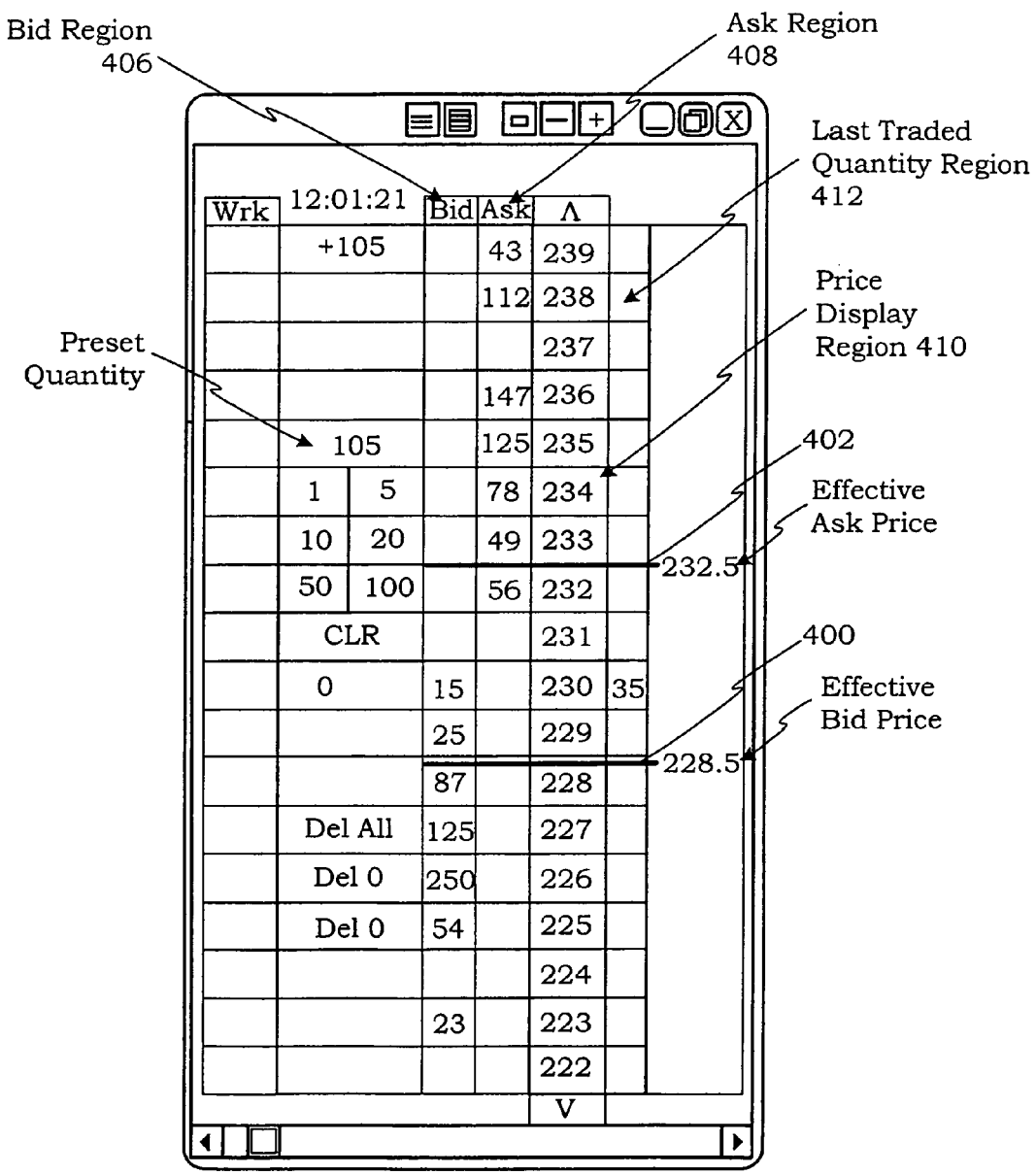
FIG. 4 is an illustration of an example trading display that indicates effective price information to the user of the display in accordance with the preferred embodiments.

FIG. 4 illustrates a trading screen, with the same general market information that was previously presented in FIG. 1, to illustrate how effective price information might be computed and indicated based on this market information.

As shown in FIG. 4, the bid display region 406 displays current market bid quantities, including those of the trader using the interface, if any. Preferably, the bid display region 406 can display direct market bids in addition to implied market bids. In the illustrated embodiment, the current market bids are aggregate bid quantities that are displayed in association with corresponding price levels. Although numbers are used as current market bid indicators, other types of indicators may be used. For instance, color or color gradients may be used to graphically indicate the number of market bids. In another example, bars may be used such that the length of the bars indicates the number of market bids. The indicators in the bid display region 406 may in addition, be color-coded, segmented or otherwise differentiated to represent a corresponding number of orders and/or the trader's orders in relation to other orders in the market.

Further, the ask display region 408 displays current market offer quantities. Preferably, the ask display region 408 can display direct market offers in addition to implied market offers. In the illustrated embodiment, the current market offers are aggregate sell quantities that are displayed in association with corresponding price levels. Similar to the display of market bids, other types of indicators may be used to indicate the number of market bids and or orders.

Price display region 410 indicates market prices or some derivative of price. Preferably arrows appear at the top and bottom of this region, and when pressed or otherwise activated, the price display region 410 scrolls so that information beyond the currently viewable area on the screen can be seen. Other methods may be used to view price levels beyond what is currently viewed such as receiving a re-centering command, spinning a wheel on a mouse input device, or depressing programmed hot keys, for example.

When the market ascends or descends the value axis in the price display region 410, the inside market might go above or below a desired number of the value levels. One could manually adjust which portion of the price display region is displayed, such as described above, or one could use the re-centering or re-positioning feature. That is, the system will re-center or re-position the inside market (or some other item of interest) on the screen. There are many ways to give a re-centering/re-positioning command. For instance, a button or hotkey may be programmed so that when it is pressed, the system automatically re-centers or re-positions the inside market on the screen. Alternatively, when the inside market is near one of the edges of the screen or after a preset timeout, the system may automatically re-center or re-position the display. The system may be programmed to re-center or re-position around something other than the inside market. For example, the system may be programmed to re-center or re-position around a theoretical price value which is fed into the system from a third-party software application.

A last traded quantity region 412 indicates the last traded quantity (LTQ) in association with its corresponding price level. The last trade quantity region 412 may also be used to display other useful items of interest. For example, preferably region 412 can be configured to display volume by price in bar, text, or some other format (e.g., volume bars, which indicate the volume traded at various price levels over set time period). Color, for example, may be used to differentiate times within the set period of time. Of course, the LTQ may alternatively be illustrated numerically and, if desired, only the most recent LTQ may be displayed instead of a series of LTQs over a set period of time.

The effective bid and ask prices were computed for a quantity of "105" in an example above, and those effective prices are used again in this example. According to FIG. 4, the line 400 indicates an effective bid price of "228.5," and the line 402 is used to indicate an effective ask price of "232.5." As market conditions change, the lines 400 and 402 can ascend or descend the static price scale. In addition to the lines 400 and 402, the effective bid and ask prices are displayed alongside the lines 400 and 402. Of course, color may also be used in highlighting the effective price information.

Now, if the trader wanted to sell "105," his effective price would be "228.5," and not the inside market bid price of "230." The effective bid price is "1.5" less than the inside market bid price. If the trader wanted to buy "105," his effective price would be "232.5," and not the inside market ask price of "232." While the effective ask price, in this example, is only "0.5" higher than the inside market ask price, this difference can be significant for large volume traders or traders who trade and execute often. In addition, by looking at the trading screen, the trader can quickly assess the effective bid/ask spread, which is a difference of "2.0" greater than the actual spread. Knowing this information, the trader can make better decisions about the trade.

Additionally, lines or some other indicator (not shown) may be used to indicate the highest effective price and the lowest effective price over a time period (e.g., for the last hour of trading, over the course of the day, over the course of the last month, etc.).

Example B

Figure 5:
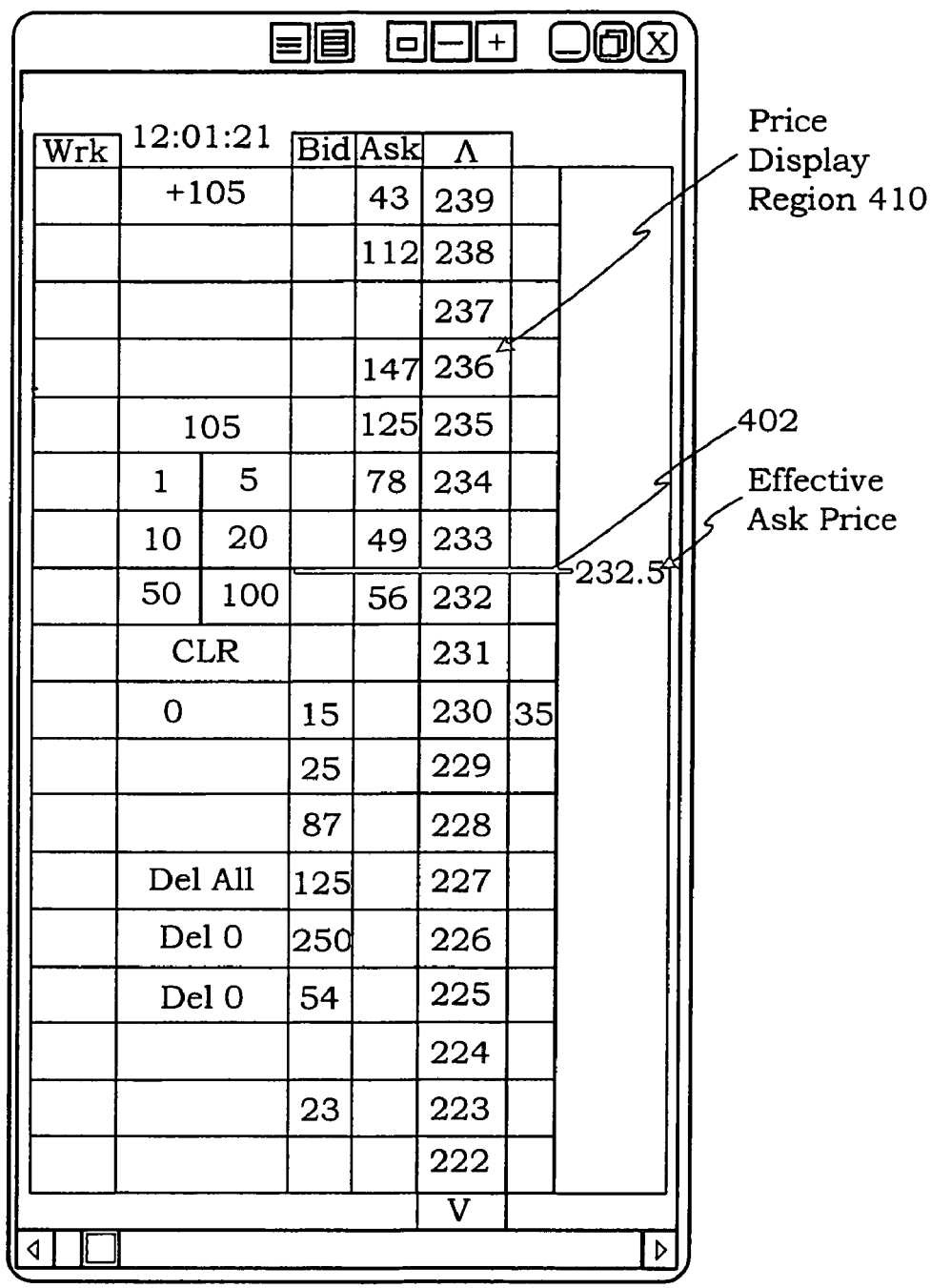
FIG. 5 is an illustration of the example trading display shown in FIG. 4, in which effective price information for either the sell side or the buy side is displayed in accordance with the preferred embodiments.

FIG. 5 illustrates the trading screen of FIG. 4, however, in this example, only the effective ask price of "232.5" is indicated. Alternatively, only the effective bid price of "228.5" could be indicated, which is not shown in FIG. 5. This feature might be useful in situations when it is already known if the order is going to be a buy order or a sell order. For instance, if the trader is going to buy the preset quantity, then an effective ask price would be indicated. Whereas, if the trader is going to sell the preset quantity, then an effective bid price would be indicated.

In accordance with this example, the system's software might recognize if the trader is going to buy or sell the preset quantity through predetermined programming or some other action. For instance, the trader could set the preset quantity parameter and indicate whether the next order will be an order to buy the preset quantity or an order to sell the preset quantity.

Example C

The feature illustrated in this example builds on the concepts illustrated in the previous examples by computing effective bid and/or ask prices for several, different quantity levels. Accordingly, the system's software may compute the effective bid and/or ask price for quantities at designated intervals. This feature may be useful, for instance, in assisting a trader in accurately and quickly determining the price at which he would buy or sell various quantities of the tradeable object.

The different quantity levels, for which effective price information is computed, may be directly or indirectly programmed by the user through a graphical user interface, a command line prompt, or through some other mechanism. Additional intelligence may also be added to determine the quantity levels. For instance, the quantity levels might be based on the type of tradeable object being traded, the trader's history of order sizes, the trader's position, or any other known basis as will be appreciated by those of ordinary skill in the art. For instance, if it is common to trade a quantity of "25," "50," or "100," of a particular tradeable object, then the effective prices may be based on one or more of those quantity levels. In another instance, if the trader typically trades a quantity of "100," "200," or "250," of a given tradeable object, then the effective prices may be based on one or more of those quantity levels. In yet another instance, if the trader's position represents the amount of a tradeable object either owned (a long position) or owed (a short position) by the trader, then the effective price(s) may be based on what it would take to close the trader's position.

Figure 6:
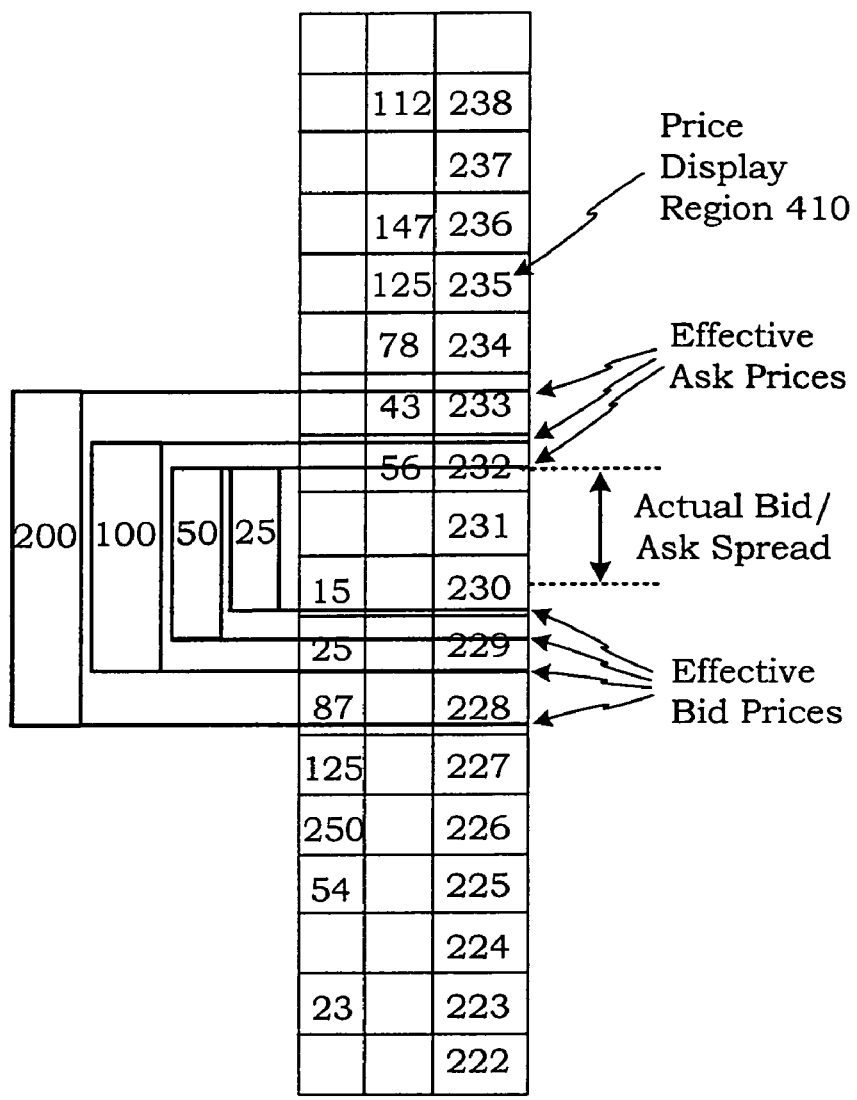
FIG. 6 is an illustration of a portion of the example trading display shown in FIG. 4, in which effective price information is indicated for several, yet different quantity levels in accordance with the preferred embodiments.

FIG. 6 illustrates a portion of the trading screen shown in FIGS. 4 and 5, except that effective bid and ask prices are computed and indicated for several, different quantity levels. For sake of illustration, effective price information is computed and displayed for quantities including "25," "50," "100," and "200." Table 1 below shows the results for these selected quantity levels. It will be understood by one of ordinary skill in the art that any quantity levels may be used in the computation.

TABLE 1

| Quantity | Effective Bid Price | Effective Ask Price |
|---|---|---|
| 25 | 229.6 | 232 |
| 50 | 229.1 | 232 |
| 100 | 228.55 | 232.45 |
| 200 | 227.91 | 233.34 |

Notice that the actual bid/ask spread in the market is "232"-"230," whereas the effective bid/ask spread is different for each quantity level (however, it is also understood that the effective price information may not always be different from the actual bid/ask prices). The effective price information for each quantity level can be displayed in any manner. One way to indicate the effective price information is illustrated in FIG. 6, in which, the effective price information is displayed in relation to the static value axis in the price display region 410.

Example D

Figure 7:
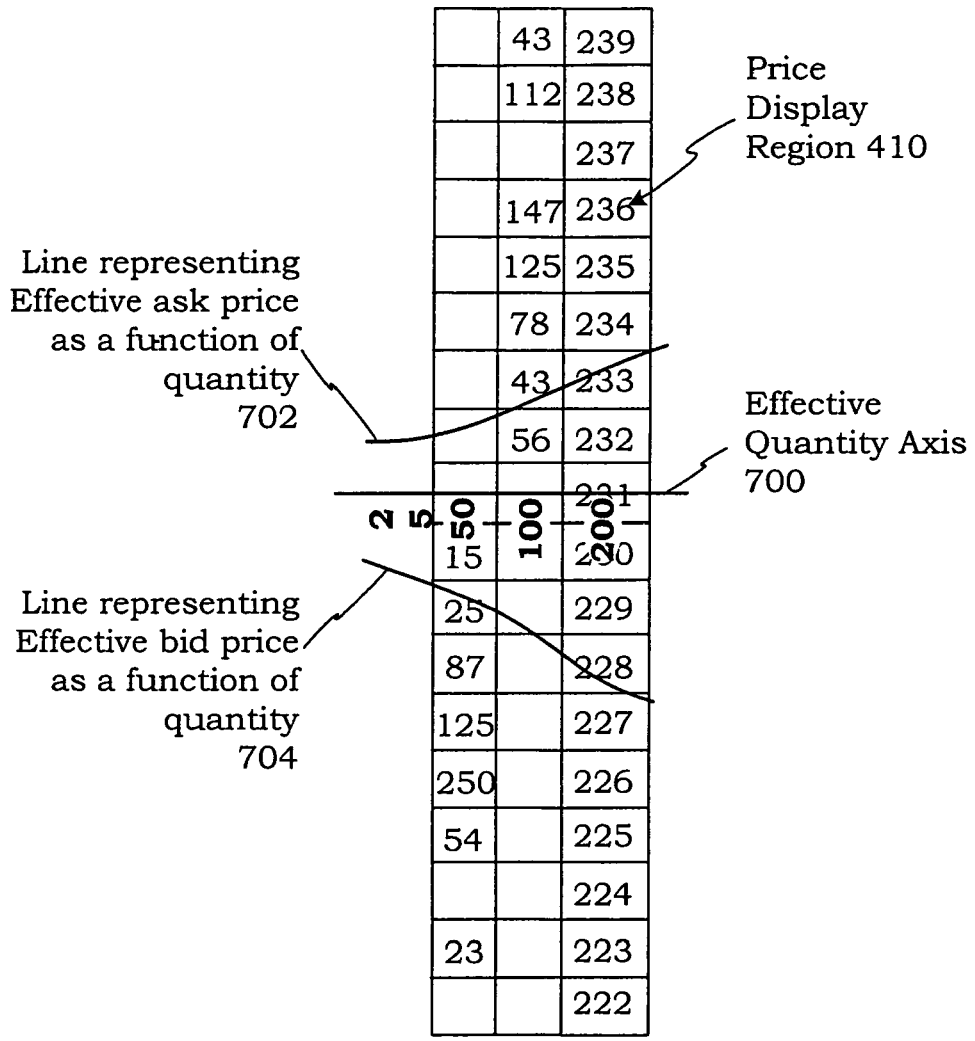
FIG. 7 is an illustration of a portion of the example trading display shown in FIG. 4, in which effective price information is plotted as a function of quantity on the display in accordance with the preferred embodiments.

FIG. 7 presents another way to indicate effective price information. According to this example, a graph is used to plot the effective price information, as a function of quantity, along an axis (referred to as an "effective quantity axis" 700 for sake of description) that is preferably perpendicular to the price display region 410. The effective quantity axis 700 is a line graduated in linear (or nonlinear) increments, such that each increment represents a particular quantity level. Then, for each quantity level, an effective bid and/or ask price is computed and plotted on the display. Line 702, which represents the effective ask price as a function of quantity, and line 704, which represents the effective bid price as a function of quantity, are displayed.

For ease of description, the same quantity levels and effective price information, which were computed and shown in Table 1 above, are used another time in this example. Notice again that as the quantity levels increase in magnitude, the higher the effective ask price and the lower the effective bid price become. This results from the system's software having to look into the market depth to find available quantities that could possibly fill the quantity at each level. One of ordinary skill in the art will appreciated that a graph of the effective price information may be displayed to the user in any particular fashion, and that the display of such information is not limited to the example shown in FIG. 7.

Further, colors may be used in the graph to distinguish certain quantity and price levels from each other. Then, a trader can more quickly assess the effective price information. In addition, the graph could be programmed so that when a cursor is placed over a particular location of the curve, the effective price associated with that location is highlighted to the user by a color, a line, a pointer, or through the use of text (actually display the effective price associated with that location).

Example E

Figure 8:
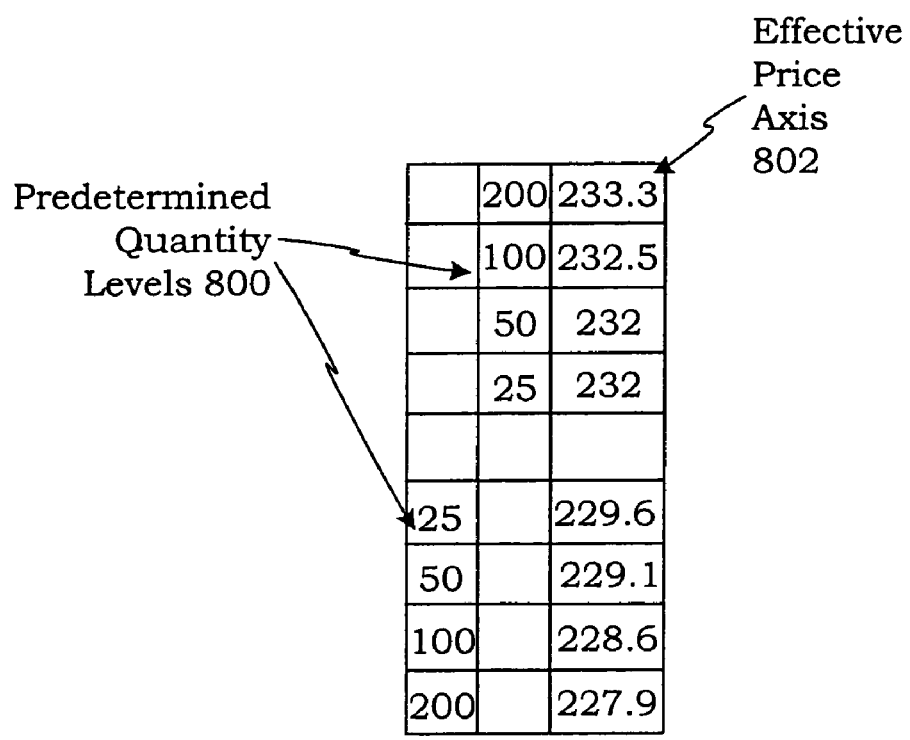
FIG. 8 is an illustration of a portion of an example trading display, in which several, yet different quantity levels are shown with their effective price information along an axis, without displaying actual prices and quantities in the market.

FIG. 8 shows a portion of a trading screen that displays effective price information in accordance with another example embodiment. According to this example embodiment, the display shows effective price information and the quantity available at such prices. It preferably does not show actual price and quantity information as do the examples shown in FIGS. 4-7. According to this feature, the user would view the market in terms of the quantity he wishes to trade without the clutter of showing actual and effective price information together.

In particular, FIG. 8 shows various predetermined quantity levels 800 (e.g., the same quantity levels as shown in Table 1) against an effective price axis 802. There, the user can quickly tell that if he bought "25," he would pay an effective price of "232." Whereas, if he bought "100," he would pay an effective price of "232.45." Further, if he bought "200," he would pay an effective price of "233.34." Moreover, if he sold "25," he would get an effective price of "229.6," and so on.

According to this example, the effective price axis 802 is used to display the effective prices for each of the quantity levels. When the market conditions change, based on new and updated market information, the effective prices may also change, in which case, the effective price values along the axis 802 change. The predetermined quantity levels may remain the same until they are too changed. In other words, the quantity levels remain at the same location on the display (e.g., such as shown in the figure), but the prices along the effective price axis 802 are dynamically updated to reflect a change in the effective prices.

In another example, an effective price axis 802 may be generated with effective price levels displayed along the axis 802 in evenly graduated increments (not shown in FIG. 8, but similar axes are shown in FIGS. 4-7). As the effective prices change for the designated quantity levels, the various quantity indicators 800 would move, relative to the effective price axis 802, to a location associated with the new effective price levels. As such, the user could tell when the effective prices have gone up or down in value for a particular quantity level.

In yet another embodiment, when quantity levels share the same effective price, the two quantity levels may be summed together and indicated along with the effective price. For example, referring to FIG. 8, the quantity levels of "25" and "50" have an effective ask price of "232." As such, the quantity levels could be combined to "75" with an effective price of "232," (this is not shown in FIG. 8). If in the future, the quantity levels have different effective prices, they may again be split up. This particular feature may be employed in systems that use a static axis of display or not.

Example F

Figure 9:
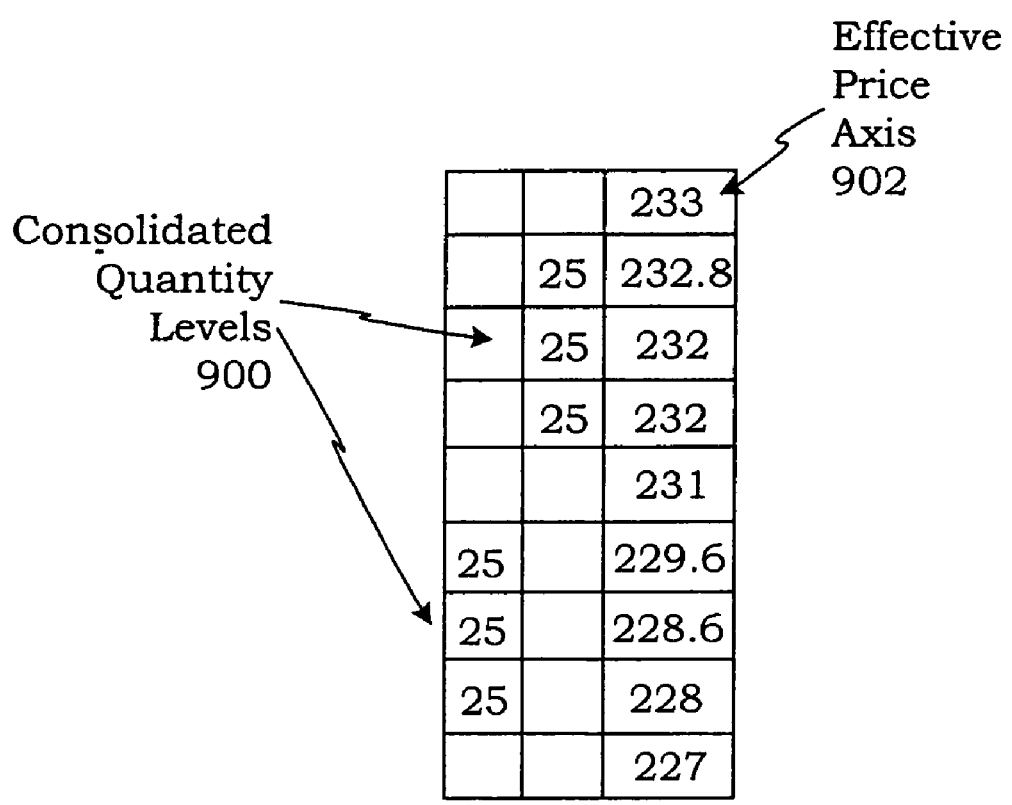
FIG. 9 is an illustration of a portion of an example trading display, in which quantity levels are consolidated into groups and are shown with their effective price information along an axis.

FIG. 9 shows a portion of a trading screen that displays effective price information in accordance with yet another embodiment. In particular, the quantity that is available in the market is consolidated into groups of a certain size. In one example, the size of each consolidated group is determined by a designated quantity or amount, which is preferably adjustable. Once the size is known, the system can consolidate the quantity into groups of equal size and then compute the effective price for each group.

For example, the designated size in this example is "25." To illustrate this example embodiment, the market information pre-consolidation is shown in FIG. 4. Now, referring to FIG. 9, three levels of consolidation are computed and indicated at 900 (three levels for the bid-side and three levels for the ask-side) along the effective price axis 902, but more or fewer levels may be computed and indicated in a similar manner. After consolidation, which is shown in FIG. 9, the user can quickly view that if he sold "25," he would get "229.6." And if he sold "25" again, he would get "228.6," and so on. Similarly, he can do the same with the opposite side of the market. The quantity consolidation feature may be used to condense a quantity into a more manageable number of groups, each with an effective price to buy or sell the quantity in the group. The effective price information may then be presented along the effective price axis 902.

To compute the effective prices shown in FIG. 9, starting at the bid side (and looking at the market information presented in FIG. 4): a quantity of "15" at "230" and a quantity of "10" at "229" are used to calculate an effective price of "229.6" for the first group of "25." The remaining quantity of "15" at "229" and a quantity of "10" at "228" are used to calculate an effective price of "228.6" for the second group of "25." Then, a quantity of "25" at "228" gives an effective price of "228." For the ask side: a quantity of "25" at "232" gives an effective price of "232" for the first group of "25." A quantity of "25" at "232" also gives an effective price of "232" for the second group of "25." Then, a quantity of "6" at "232" and a quantity of "19" at "233" are used to calculate an effective price of "232.8." Additional levels may be computed.

IV. Conclusion

A system and method are provided herein to compute and display effective price information. Effective price information provides the user with a more accurate representation of what the user would pay or get for trading a particular quantity under the current market conditions. The user may then quickly determine, preferably with reduced mental effort, the prices at which possible orders would get filled.

Additionally, the concepts of effective bid and/or ask prices may be extended to computing effective bid and/or ask yields or some other effective bid and/or ask information. As such, effective information may be computed using any derivative of price.

The effective price information may be indicated to the user through some graphical interface and/or it may be used by automated trading tools. For instance, if used by an automated trading tool, the effective price information might be relayed to the tool for use in the tool's own calculations. In such instances, the effective price information might not need to be displayed.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

What is claimed is:

1. A method for electronic trading of a tradeable object, the method comprising:

receiving a market information for a tradeable object via a trading device, the market information identifying a plurality of orders for the tradeable object pending execution at an electronic exchange, the plurality of orders including inside market orders at an inside market for the tradeable object and at least one outside market order outside of the inside market for the tradeable object, where each order of the plurality of orders includes a quantity to buy or sell the tradeable object at a price;

generating a price axis for the tradeable object on a display associated with the trading device, the price axis being generated according to the market information and having a plurality of consecutive price levels for the tradeable object;

generating order indicators along the price axis, where each order indicator is associated with at least one of the plurality of orders and is located along the price axis according to the price of the at least one of the plurality of orders;

receiving a range of quantity levels for trading the tradeable object via the trading device, the range of quantity levels having at least a minimum quantity level and a maximum quantity level;

generating an effective quantity axis relative to the price axis via the trading device, the effective quantity axis having a range corresponding to the range of quantity levels for trading the tradeable object;

generating an effective ask price indicator as a function of the range of quantity levels via the trading device, where the effective ask price indicator is generated along the price axis and the effective quantity axis and where the effective ask price indicator includes a plurality of effective ask prices each determined according to the market information and a corresponding quantity level of the plurality of quantity levels;

generating an effective bid price indicator as a function of the range of quantity levels axis via the trading device, where the effective bid price indicator is generated along the price axis and the effective quantity axis and where the effective bid indicator includes a plurality of effective bid prices each determined according to the market information and a corresponding quantity level of the plurality of quantity levels;

receiving a user command via a user input device associated with the trading device, the user command identifying a selected one of the plurality of consecutive price levels of the price axis relative to the effective ask price indicator and the effective bid price indicator; and initiating submission of a user order for the tradeable object to the electronic exchange via the trading device, the user order having an order price corresponding to the selected one of the plurality of consecutive price levels.

2. The method of claim 1, where the order indicators include a highest bid indicator associated with a highest bid order of the plurality of orders and a lowest ask indicator associated with a lowest ask order of the plurality of orders, where the highest bid indicator is generated at a bid location of the price axis corresponding to a highest bid price and the a lowest ask indicator is generated at an ask location of the price axis corresponding to the lowest ask price.

3. The method of claim 1 where the order indicators represent a quantity.

4. The method of claim 1 where the effective ask price indicator and the effective bid price indicator are generated along the price axis for each quantity level of the range of quantity levels for trading the tradeable object.

5. The method of claim 1 where each effective bid price and each effective ask price comprises a weighted average of prices for the corresponding quantity level of the plurality of quantity levels.

6. The method of claim 1 where each effective bid price represents an average price to close a long open position for the corresponding quantity level of the plurality of quantity levels.

7. The method of claim 1 where each effective ask price represents an average price to close a short open position for the corresponding quantity level of the plurality of quantity levels.

8. The method of claim 1 wherein the effective bid price and the effective ask price are generated according to:

$$\frac{quantity_1}{amount}(price_1) + \ldots + \frac{quantity_N}{amount}(price_N)$$

where "amount" comprises the corresponding quantity level of the plurality of quantity levels, "quantity" comprises a quantity at a price to fill part of the "amount," "price" comprises the price, and "N" represents a number of price levels to fill the "amount," where amount=$\Sigma_{i=1}^{N}$quantity$_i$.

9. The method of claim 1 where the effective ask price indicator and the effective bid price indicator comprise any of a line indicator, a numerical indicator, a color coded indicator and combinations thereof.

10. The method of claim 1 where the effective quantity axis is perpendicular to the price axis.

11. The method of claim 1 where the price axis comprises a static axis of values.

12. The method of claim 1 further comprising generating the effective price axis along the price axis at the inside market.

13. The method of claim 1 further comprising determining the range of quantity levels according to any of a type of tradeable object, trader history, trader history of order size, available order size for the tradeable object, common trade sizes for the tradeable object and combinations thereof.

14. Storing on a non-transitory computer readable medium instructions therein that when executed by a processor, cause the processor to carry out acts comprising:

receiving a market information for a tradeable object, the market information identifying a plurality of orders for the tradeable object pending execution at an electronic exchange, the plurality of orders including inside market orders at an inside market for the tradeable object and at least one outside market order outside of the inside market for the tradeable object, where each order of the plurality of orders includes a quantity to buy or sell the tradeable object at a price;

generating a price axis for the tradeable object on a display according to the market information, the price axis having a plurality of consecutive price levels for the tradeable object;

generating order indicators along the price axis, where each order indicator is associated with at least one of the plurality of orders and is located at one of the plurality of consecutive price levels corresponding to the price of the at least one of the plurality of orders;

receiving a range of quantity levels for trading the tradeable object, the range of quantity levels having at least a minimum quantity level and a maximum quantity level;

generating an effective quantity axis relative to the price axis, the effective quantity axis having a range corresponding to the range of quantity levels for trading the tradeable object;

generating an effective ask price indicator as a function of the range of quantity levels via the trading device, where the effective ask price indicator is generated along the price axis and the effective quantity axis and where the effective ask price indicator includes a plurality of effective ask prices each determined according to the market information and a corresponding quantity level of the plurality of quantity levels;

generating an effective bid price indicator as a function of the range of quantity levels axis, where the effective bid price indicator is generated along the price axis and the effective quantity axis and where the effective bid indicator includes a plurality of effective bid prices each determined according to the market information and a corresponding quantity level of the plurality of quantity levels;

receiving a user command, the user command identifying a selected one of the plurality of consecutive price levels of the price axis relative to the effective ask price indicator and the effective bid price indicator; and initiating submission of a user order for the tradeable object to the electronic exchange, the user order having an order price corresponding to the selected one of the plurality of consecutive price levels.

15. The computer readable medium of claim 14 where each effective bid price represents an average price to close a long open position for the corresponding quantity level of the plurality of quantity levels.

16. The computer readable medium of claim 14 where each effective ask price represents an average price to close a short open position for the corresponding quantity level of the plurality of quantity levels.

17. The computer readable medium of claim 14 where the effective ask price indicator and the effective bid price indicator comprise any of a line indicator, a numerical indicator, a color coded indicator and combinations thereof.

18. The computer readable medium of claim 14 where the effective quantity axis is perpendicular to the price axis.

19. The computer readable medium of claim 14 where the price axis comprises a static axis of values.

20. The computer readable medium of claim 14 where the effective bid price and the effective ask price are generated according to:

$$\frac{quantity_1}{amount}(price_1) + \ldots + \frac{quantity_N}{amount}(price_N)$$

where "amount" comprises the corresponding quantity level of the plurality of quantity levels, "quantity" comprises a quantity at a price to fill part of the "amount," "price" comprises the price, and "N" represents a number of price levels to fill the "amount," where amount=$\Sigma_{i=1}^{N}$quantity$_i$.

21. The computer readable medium of claim 14 where the effective ask price indicator and the effective bid price indicator are generated along the price axis for each quantity level of the range of quantity levels for trading the tradeable object.

* * * * *